Patented Oct. 4, 1927.

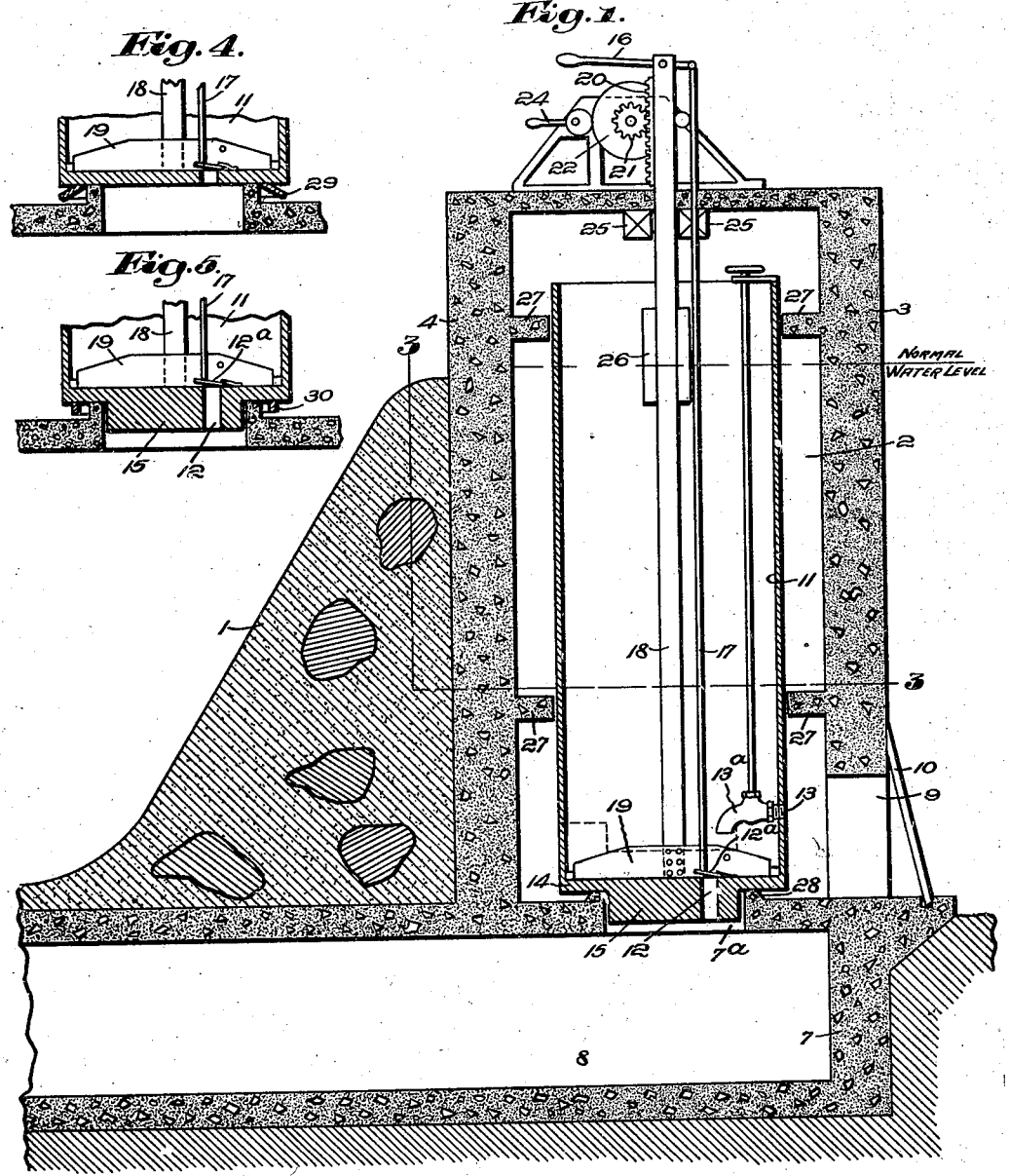

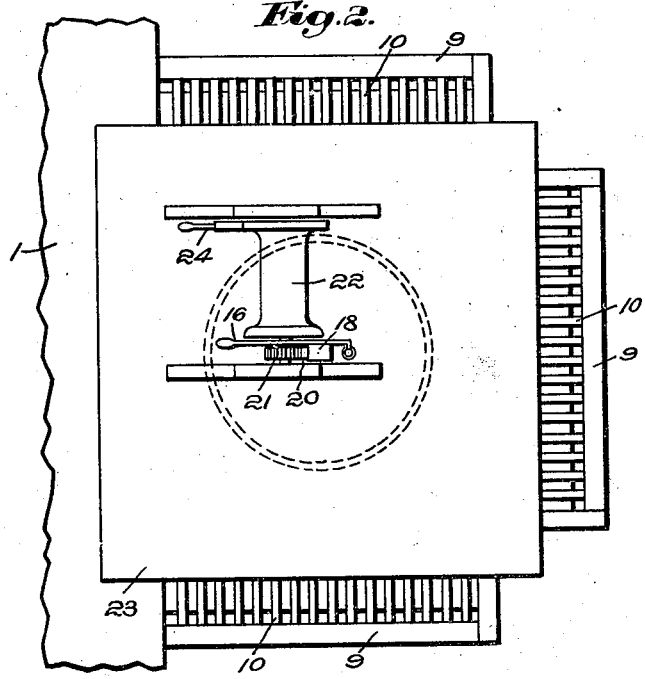
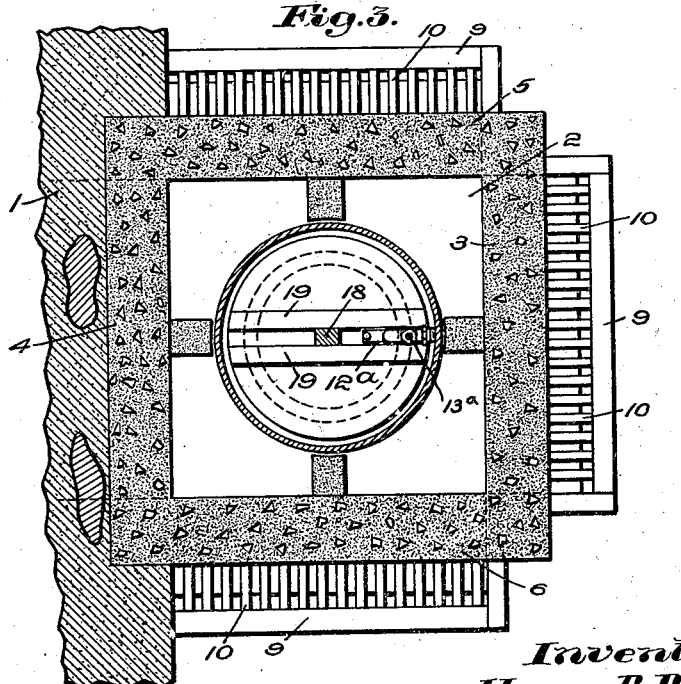

1,644,445

UNITED STATES PATENT OFFICE.

HENRY B. PRATT, OF ANTRIM, NEW HAMPSHIRE.

SLUICE-GATE CONSTRUCTION.

Application filed September 27, 1924. Serial No. 740,262.

This invention relates to sluice gates for controlling the flow of water at dams, locks and similar structures, and its object is to provide an improved gate having, among others, the advantages and novel features hereinafter pointed out.

In the drawings of one embodiment of my invention selected for illustration and description, Fig. 1 is a vertical section through a conventional form of dam showing my improved gate construction;

Fig. 2, a plan of the same partly broken away; and

Fig. 3, a cross section on the line 3—3, Fig. 1;

Figs. 4 and 5 respectively show modified forms of construction of the lower gate end.

Referring to Figs. 1, 2, 3, the dam 1 is constructed of any desirable material, as earth or concrete, in the illustration the former is shown, and of required width and height. At the desired spot, a gate protecting chamber and guide 2 is formed with a front wall 3, rear wall 4, and side walls 5, 6, of concrete, iron, brick or wood, solid or otherwise as may be desired, the chamber in this instance being rectangular although it might be of any preferred form, and of suitable height. These chamber walls, Fig. 1, rest upon a suitable foundation 7 having formed within it a passage 7ª to a sluice way 8 leading down stream. It should be understood that the chamber 2, as such, is not a necessary feature of my invention, as any enclosure or skeleton structure or suitable guide to protect the gate from trash in the water and guide it in its movement is all that is necessary.

The wall 3, Figs. 1, 3, has water inlet openings or portals 9 of suitable size on the front and both sides or one at any one or more of these points as desired, which are guarded by trash racks 10, which may be inclined bars positioned against the walls 3, 5, 6, and the foundation 7 to prevent the entry into the chamber 2 of rubbish of any kind in quantity or size sufficient to cause damages to the gate or interfere with its operation.

Within the chamber 2 and of suitable size and shape, cylindrical or otherwise, herein the former, is a gate 11, herein open at the top, and closed at the sides and the bottom or lower end, but having in that end a water outlet port or opening 12 and having in the side wall a water inlet port or opening 13. This inlet opening is of required size, but preferably smaller than the outlet opening 12. The inlet 13 preferably has a cock 13ª controlled by a valve stem extended to the top of the gate, so that the inlet 13 may be closed against water if at any time that should be desirable, as for instance to repair the inside of the gate. The lower end 14 of the gate 11 is provided with a thicker or downwardly extended portion 15 which I term a baffle for the reason hereinafter pointed out. The outlet 12 is closed by a flap valve 12ª of any suitable construction which is operated from the top of the chamber by a lever 16 connected to the valve by a link 17, the lever being pivoted to an upright stem 18 secured to the cross beams 19, Figs. 1 and 3, at the bottom of the gate and extended upwardly above the top of the gate a suitable distance to act as a guide for the latter in its upward travel and as a means of controlling somewhat the action of the gate.

At its upper end, Figs. 1, 2, the stem 18 is provided with a rack 20 which engages a gear 21 on a winch 22 on the top 23 of the chamber. A brake 24 is provided for the winch so that the movement of the gate may be controlled on its upward travel and prevented from rising either fast or far enough to do any damage. On the chamber top, as a precaution, bumpers 25 are provided to be engaged by a striker 26 on the stem 18 for the same purpose, and guides 27 are provided on the chamber wall. In Fig. 1 the gate is shown as closed and the normal water level in the stream above and in the gate and its chamber is indicated by the appropriate legend.

The method of using my novel gate is as follows:

To open the gate, the cock 13ª being normally open, the valve 12ª is raised by means of the lever 16 and link 17 to allow the water to escape from within the gate by means of the outlet 12, which it will do, without closing the valve 13ª, inasmuch as, as stated, the outlet 12 is larger than the inlet 13. When the water in the gate has been lowered to the point where the weight of the water in the gate plus the weight of the gate is less than the upward pressure of the water against that portion of the lower end of the gate laterally overhanging the gate seat 28 about the outlet 7ª, the gate will rise, at first slowly and then rapidly, and its travel should be checked and controlled by means of the brake 24. As the gate leaves its seat 28, the water rushes between the gate end and its seat and, to ensure the raising of the gate sufficiently under all conditions, the baffle 15 is provided. The rushing of the water past and against the baffle retards the flow of water and gives the gate further upward pressure and the additional impetus ensures the raising of the gate to the point indicated by dotted lines unless stopped by the brake, the water escaping to the sluice way 8. Obviously some water may continue to enter the inlet 13 in the gate but the inlet being smaller than the outlet 12, the water will at once flow out again. Other forms of baffle members 29, as at Fig. 4 and 30 as at Fig. 5 may be used if desired, as shown in Figs. 4, 5, respectively.

To close the gate, the valve 12ª is closed, and as the water from the portal 9 fills the gate through inlet 13, the gate will gradually settle and finally close the outlet 7ª.

My novel gate, whatever its size, can readily be operated by one man because the gate is opened and closed by the pressure or weight of the water as the case may be, with practically no friction, while sliding gates, owing to the immense pressure of water against them on one side only, require the strength of several men or machinery to operate them. Obviously the greater the overhang of the bottom of the gate on its seat, the greater will be the water pressure tending to raise the gate. The gate will also open and close quicker than manually or power operated gates.

My invention is not restricted in all particulars to the particular embodiment shown.

I claim—

1. Sluice gate construction comprising a normally floating unsupported gate, a water inlet thereto, a water outlet therefrom, means to close the inlet and outlet, a seat for the gate of less diameter than the end of the gate providing an overhang of the latter and a water passage through the seat, whereby head water pressure unaided raises the gate when empty.

2. Sluice gate construction comprising a gate normally floating from its own inherent buoyancy having a water inlet and a water outlet and an overhanging lower end with a baffle portion, means to open and close the outlet to raise and lower the gate, and a seat having a water passage therethrough and with a head water space about it and beneath the overhanging gate end to unseat the gate.

3. Sluice gate construction comprising a buoyant gate, a seat therefor of less diameter than the gate with a water passage therethrough, the displacement of said gate lying without the vertical projection of said seat being of such magnitude that the upward pressure on the horizontal projection of said gate lying outside the vertical projection of the seat will cause the gate to rise when the interior of the gate is unwatered, and the overbalancing of this pressure by filling the gate will cause the gate to return to its seat.

4. Sluice gate construction comprising a normally floating springless gate, a water inlet and outlet therefor, valves for said inlet and outlet by means of which it may be filled and emptied of water, a seat for the gate having a water passage therethrough and providing a head water space around the seat and beneath the gate end to unseat the gate when empty.

5. Sluice gate construction comprising a normally floating gate supported only by the water and having a water inlet and a water outlet, means to open and close said inlet and outlet, and a seat for the gate constructed and arranged to provide a water bearing surface about it and beneath the gate end, to enable the head water to unseat the gate when empty.

6. Sluice gate construction comprising a normally floating gate with a water inlet and outlet only in its lower end, valves for opening and closing said inlet and outlet to fill and empty the gate, a rib like seat for the gate having a water passage therethrough and providing an overhang for the gate end and a baffle member on the gate end to permit the water to raise the gate.

7. Sluice gate construction comprising a buoyant gate with a water inlet and outlet, a guide therefor, a seat for the gate with a water outlet therethrough, means to close the inlet and outlet, a stem for the gate, and a brake for the stem to control the nature of movement of the gate.

8. Sluice gate construction comprising a normally floating gate having a water inlet and outlet only therein and a valve for the outlet to control the buoyancy of the gate, a baffle member on the lower gate end, a seat for the gate with a water passage therethrough, said seat corresponding in outline to the outline of the baffle member and providing thereabout and beneath the gate end water pressure surface to unseat the gate.

9. Sluice gate construction comprising a curvilinear gate with a water inlet and outlet, a guide for the gate, means to close the inlet and outlet, a stem for the gate and a brake for controlling the action of stem and gate.

10. Sluice gate construction comprising, in combination, a gate; a seat therefor of less diameter than said gate; means to admit head pressure to the under side of the gate outside of the seat, and means to admit liquid to and discharge it from the interior of the gate whereby head pressure may be employed to hold the gate upon its seat, and the release of such pressure from the gate permits head pressure beneath the gate and outside the seat to lift the gate and permit discharge of head liquid from the seat.

11. Sluice gate construction comprising, in combination, a gate; a seat therefor of less diameter than said gate; means to admit head pressure to the under side of the gate outside of the seat; means to admit liquid to and discharge it from the interior of the gate whereby head pressure may be employed to hold the gate upon its seat, and the release of such pressure from said gate permits head pressure beneath the gate and outside the seat to lift the gate and permit discharge of head liquid through the seat; and means connected with the gate and extending within the seat to limit the area of discharge through said seat during a portion of the opening travel of the gate.

12. Sluice gate construction comprising, in combination, a gate; a seat therefor of less diameter than the gate; means to admit head pressure to the bottom of the gate outside the seat; means to admit liquid to and discharge it from the interior of the gate whereby head pressure may be employed to hold the gate upon its seat, and the release of such pressure from the gate permits head pressure beneath the gate and outside the seat to lift the gate and permits discharge of the head liquid through the seat; and means connected with the gate and extending within the seat to limit the area of discharge through the seat during the initial opening movement of the gate.

13. Sluice gate construction comprising, in combination, a gate; a seat therefor of less diameter than the gate; means to admit head pressure to the bottom of the gate outside the seat; means to admit liquid to and discharge it from the interior of the gate whereby head pressure may be employed to hold the gate upon its seat, and the release of such pressure from the gate permits head pressure beneath the gate outside the seat to lift the gate and permits discharge of head liquid through the seat; and means independent of the fluid action on the gate to control the movement of the latter.

14. Sluice gate construction comprising a normally floating gate, a water inlet and outlet therefor, valves for said inlet and outlet by means of which it may be filled and emptied of water, a seat for the gate so constructed as to admit head water thereunder when the gate is closed, to open the gate when it is empty.

15. Sluice gate construction comprising, in combination, a gate, a head water inlet thereto and outlet therefrom, a seat for the gate with a water passage therethrough and providing head water pressure simultaneously about the seat and beneath the gate, whereby when the head water is drawn from the gate, the head water beneath the gate acts to raise it.

16. Sluice gate construction comprising, in combination, a seat with a water discharge passage therethrough, a gate thereon, having an inlet and outlet to seat and unseat the gate, and admitting head pressure normally beneath the lower end of the gate when the latter is seated.

17. Sluice gate construction comprising a bouyant gate 11 higher when seated than the normal water line, having a water inlet 13 and outlet 12 only therein, a baffle member 15 and seat 28 for the gate, whereby the gate will float automatically when empty, and will seat itself automatically when filled.

18. Sluice gate construction comprising, in combination, a gate; a seat therefor of less diameter than said gate; means to admit head pressure to the under side of the gate outside said seat, and means to vary the volume of liquid within said gate whereby to cause head pressure within the gate to hold the gate upon its seat or the head pressure beneath the gate and outside the seat to act upon and in a direction tending to initially lift said gate, the effective lifting pressure varying according to variation in the volume of liquid contained within said gate.

19. Sluice gate construction comprising, in combination, a gate seat having an open discharge opening therethrough; a gate movable relative to said seat to cover and uncover said opening; means to admit liquid under pressure both internally to and externally of said gate, said liquid increasing the weight of the gate when admitted internally; and means to discharge the liquid from within said gate to increase the buoyancy of the gate thereby to facilitate and initiate movement thereof to uncover the gate seat.

20. Sluice gate construction comprising, in combination, a gate; a seat therefor of less diameter than said gate; means to admit head pressure to the under side of the gate outside the seat; means to admit liquid to the gate; means of larger capacity to discharge liquid from the gate; and means for opening and closing the latter whereby head pressure acting within the gate will hold the latter to its seat, and acting without the gate will exert substantial lifting action upon the gate.

21. Sluice gate construction comprising, in combination, a gate; a seat therefor of less diameter than said gate; means to admit head pressure to the under side of the gate outside the seat, a liquid inlet opening to admit liquid under head pressure to the interior of the gate to hold the latter upon its seat, and a discharge opening of larger capacity than said inlet opening, and means to vary its capacity, thereby to vary the volume of liquid contained in said gate whereby to permit head pressure without the gate and outside said seat to exert substantial lifting action upon the gate.

22. Sluice gate construction comprising a normally floating unsupported gate, a water inlet thereto, a water outlet therefrom, means to close the outlet, a seat for the gate having a water passage therethrough, said seat being of less diameter than the end of the gate providing an overhang of the latter, whereby head water pressure exerts substantial lifting action upon the gate when empty.

In testimony whereof, I have signed my name to this specification.

HENRY B. PRATT.